(12) United States Patent
Jung et al.

(10) Patent No.: US 12,339,521 B2
(45) Date of Patent: Jun. 24, 2025

(54) EYEGLASSES WITH ASSOCIATED TRUE WIRELESS EARBUDS

(71) Applicant: Skullcandy, Inc., Park City, UT (US)

(72) Inventors: Ryan Jung, Holladay, UT (US); James Michael Jacobs, Park City, UT (US); Kyle Edward Arnett, North Salt Lake City, UT (US)

(73) Assignee: Skullcandy, Inc., Park City, UT (US)

( * ) Notice: Subject to any disclaimer, the term of this patent is extended or adjusted under 35 U.S.C. 154(b) by 630 days.

(21) Appl. No.: 17/452,484

(22) Filed: Oct. 27, 2021

(65) Prior Publication Data

US 2022/0128841 A1    Apr. 28, 2022

Related U.S. Application Data

(60) Provisional application No. 63/198,563, filed on Oct. 27, 2020.

(51) Int. Cl.
| | |
|---|---|
| *G02C 11/00* | (2006.01) |
| *H04R 1/10* | (2006.01) |
| *H02J 50/10* | (2016.01) |
| *H02J 50/20* | (2016.01) |

(52) U.S. Cl.
CPC .......... *G02C 11/10* (2013.01); *H04R 1/1016* (2013.01); *H04R 1/1025* (2013.01); *H04R 1/1041* (2013.01); *H02J 50/10* (2016.02); *H02J 50/20* (2016.02); *H04R 2420/07* (2013.01)

(58) Field of Classification Search
None
See application file for complete search history.

(56) References Cited

U.S. PATENT DOCUMENTS

| | | | |
|---|---|---|---|
| 2,459,325 | A | 1/1949 | Knowles |
| 4,902,120 | A | 2/1990 | Weyer |
| 5,606,743 | A | 2/1997 | Vogt et al. |
| 5,608,808 | A | 3/1997 | Da Silva |
| 5,737,436 | A | 4/1998 | Boyden |
| 5,988,812 | A | 11/1999 | Wingate |

(Continued)

FOREIGN PATENT DOCUMENTS

| | | |
|---|---|---|
| EP | 0351461 A1 | 1/1990 |
| WO | 99/50706 A1 | 10/1999 |

(Continued)

*Primary Examiner* — Darryl J Collins
(74) *Attorney, Agent, or Firm* — TraskBritt

(57) ABSTRACT

Systems including a right true wireless earbud, a left true wireless earbud, and eyeglasses are disclosed. Eyeglasses may include a left temple having a feature configured to selectively couple with the left true wireless earbud, and a right temple having a feature configured to selectively couple with the right true wireless earbud. For some eyeglasses, a left accessory arm may be coupled to the left temple, the left accessory arm configured to couple with a left true wireless earbud, and a right accessory arm may be coupled to the right temple, the right accessory arm configured to couple with a right true wireless earbud. For additional eyeglasses, a left storage compartment may be located in the left temple sized and configured to couple with a left true wireless earbud, and a right storage compartment located in the right temple sized and configured to couple with a right true wireless earbud.

17 Claims, 4 Drawing Sheets

(56) References Cited

U.S. PATENT DOCUMENTS

| | | |
|---|---|---|
| 7,219,994 B2 | 5/2007 | Jannard et al. |
| 7,639,825 B2 | 12/2009 | Fukuda |
| 8,107,648 B2 | 1/2012 | Nakatani |
| 8,111,860 B2 | 2/2012 | Retchin et al. |
| 8,325,964 B2 | 12/2012 | Weisman |
| 8,385,576 B2 | 2/2013 | Hedrick et al. |
| 8,553,910 B1 | 10/2013 | Dong et al. |
| 8,699,742 B2 | 4/2014 | Heiman et al. |
| 8,744,113 B1 * | 6/2014 | Rickards ................ H04R 1/028 381/381 |
| 8,905,542 B2 | 12/2014 | Howell et al. |
| 8,989,410 B2 | 3/2015 | Hebenstreit |
| 9,020,168 B2 | 4/2015 | Karkkainen et al. |
| 9,025,795 B2 | 5/2015 | Adachi |
| 9,105,261 B2 | 8/2015 | Horii |
| 9,402,116 B2 | 7/2016 | Qi et al. |
| 9,438,988 B2 | 9/2016 | Campbell |
| 9,462,365 B1 | 10/2016 | Dong et al. |
| 9,596,534 B2 | 3/2017 | Heiman et al. |
| 9,686,603 B2 | 6/2017 | Zheng et al. |
| 9,998,829 B2 | 6/2018 | Asfaw |
| 10,142,735 B2 | 11/2018 | Jan |
| 10,288,886 B2 | 5/2019 | Jannard |
| 10,321,217 B2 | 6/2019 | Kubba et al. |
| 10,419,843 B1 | 9/2019 | Mehra et al. |
| 10,560,777 B1 | 2/2020 | Gui et al. |
| 10,616,696 B2 | 4/2020 | Ql et al. |
| 10,659,868 B1 | 5/2020 | Xu et al. |
| 10,699,691 B1 | 6/2020 | Ye et al. |
| 10,743,094 B2 | 8/2020 | Jan |
| 11,156,855 B2 * | 10/2021 | Anderson ............ G02B 27/017 |
| 2005/0046790 A1 | 3/2005 | Jannard et al. |
| 2009/0060231 A1 | 3/2009 | Buroojy |
| 2011/0158443 A1 | 6/2011 | Asnes et al. |
| 2017/0219831 A1 | 8/2017 | Haddick et al. |
| 2017/0318379 A1 | 11/2017 | Bullen et al. |
| 2018/0234779 A1 | 8/2018 | Hsieh et al. |
| 2019/0014425 A1 | 1/2019 | Liao et al. |
| 2020/0064654 A1 * | 2/2020 | De La Fuente ........ G02C 11/10 |
| 2020/0219526 A1 | 7/2020 | Qi et al. |
| 2020/0400968 A1 * | 12/2020 | Ryan ...................... G02C 5/146 |
| 2023/0119236 A1 * | 4/2023 | Lin ...................... H04R 1/1041 |

FOREIGN PATENT DOCUMENTS

| | | |
|---|---|---|
| WO | 2014/163794 A2 | 10/2014 |
| WO | 2018/160243 A1 | 9/2018 |
| WO | 2020/038476 A1 | 2/2020 |
| WO | 2020/038482 A1 | 2/2020 |
| WO | 2020/102224 A1 | 5/2020 |
| WO | 2020/140446 A1 | 7/2020 |
| WO | 2020/140450 A1 | 7/2020 |
| WO | 2020/140453 A1 | 7/2020 |
| WO | 2020/140458 A1 | 7/2020 |
| WO | 2020/140460 A1 | 7/2020 |

* cited by examiner

EYEGLASSES WITH ASSOCIATED TRUE WIRELESS EARBUDS

CROSS-REFERENCE TO RELATED APPLICATION

This application claims the benefit under 35 U.S.C. § 119(e) of U.S. Provisional Patent Application Ser. No. 63/198,563, filed Oct. 27, 2020, the disclosure of which is hereby incorporated herein in its entirety by this reference.

TECHNICAL FIELD

This disclosure relates generally to eyeglasses associated with true wireless earbuds, and more specifically to eyeglasses configured for electrical communication with true wireless earbuds.

BACKGROUND

True wireless earbuds have become a popular alternative to conventional wired headphones. True wireless earbuds allow the user to listen to music and podcasts, participate in two-way voice and video communications, and hear audio for videos without the inconveniences associated with wired headphones. True wireless earbuds are commonly sold with a case that is used to charge and store the earbuds.

BRIEF SUMMARY

In some embodiments, systems including a right true wireless earbud, a left true wireless earbud, and eyeglasses are disclosed. The eyeglasses may include a left temple having a feature configured to selectively couple with the left true wireless earbud, and a right temple having a feature configured to selectively couple with the right true wireless earbud.

In further embodiments, eyeglasses may include a left accessory arm coupled to a left temple, the left accessory arm configured to couple with a left true wireless earbud, and a right accessory arm coupled to a right temple, the right accessory arm configured to couple with a right true wireless earbud.

In yet further embodiments, eyeglasses may include a left storage compartment located in a left temple, the left storage compartment sized and configured to couple with a left true wireless earbud, and a right storage compartment located in a right temple, the right storage compartment sized and configured to couple with a right true wireless earbud.

BRIEF DESCRIPTION OF THE DRAWINGS

While this disclosure concludes with claims particularly pointing out and distinctly claiming specific embodiments, various features and advantages of embodiments within the scope of this disclosure may be more readily ascertained from the following description when read in conjunction with the accompanying drawings.

DETAILED DESCRIPTION

Figure 1:
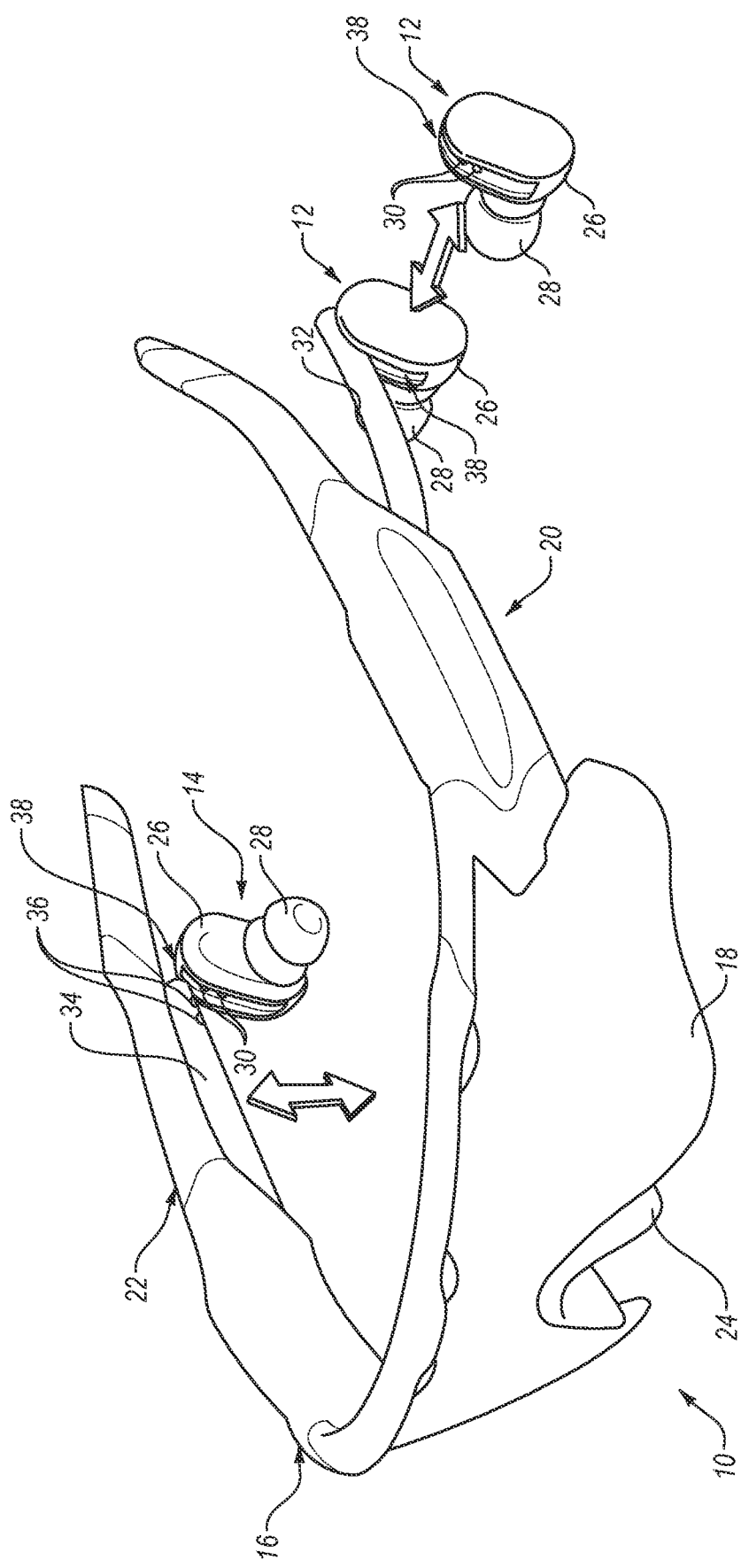
FIG. 1 is an isometric top view of eyeglasses with associated true wireless earbuds according to an embodiment of the present disclosure.

In the following detailed description, reference is made to the accompanying drawings, which form a part hereof, and in which are shown, by way of illustration, specific examples of embodiments in which the present disclosure may be practiced. These embodiments are described in sufficient detail to enable a person of ordinary skill in the art to practice the present disclosure. However, other embodiments enabled herein may be utilized, and structural, material, and process changes may be made without departing from the scope of the disclosure.

The illustrations presented herein are not meant to be actual views of any particular method, system, device, or structure, but are merely idealized representations that are employed to describe the embodiments of the present disclosure. In some instances similar structures or components in the various drawings may retain the same or similar numbering for the convenience of the reader; however, the similarity in numbering does not necessarily mean that the structures or components are identical in size, composition, configuration, or any other property.

The following description may include examples to help enable one of ordinary skill in the art to practice the disclosed embodiments. The use of the terms "exemplary," "by example," and "for example," means that the related description is explanatory, and though the scope of the disclosure is intended to encompass the examples and legal equivalents, the use of such terms is not intended to limit the scope of an embodiment or this disclosure to the specified components, steps, features, functions, or the like.

It will be readily understood that the components of the embodiments as generally described herein and illustrated in the drawings could be arranged and designed in a wide variety of different configurations. Thus, the following description of various embodiments is not intended to limit the scope of the present disclosure, but is merely representative of various embodiments. While the various aspects of the embodiments may be presented in the drawings, the drawings are not necessarily drawn to scale unless specifically indicated.

Furthermore, specific implementations shown and described are only examples and should not be construed as the only way to implement the present disclosure unless specified otherwise herein. Elements, circuits, and functions may be shown in block diagram form in order not to obscure the present disclosure in unnecessary detail. Conversely, specific implementations shown and described are exemplary only and should not be construed as the only way to implement the present disclosure unless specified otherwise herein. Additionally, block definitions and partitioning of logic between various blocks is exemplary of a specific implementation. It will be readily apparent to one of ordinary skill in the art that the present disclosure may be practiced by numerous other partitioning solutions. For the most part, details concerning timing considerations and the like have been omitted where such details are not necessary to obtain a complete understanding of the present disclosure and are within the abilities of persons of ordinary skill in the relevant art.

FIG. 1 shows an isometric top view of eyeglasses 10 and associated earbuds 12, 14 according to an embodiment of the present disclosure. The eyeglasses 10 may comprise a frame 16 and at least one lens 18. The frame 16 may comprise a left temple 20, and a right temple 22, which may be configured to extend over a wearer's ears. The eyeglasses 10 may additionally include a nose pad 24, which may be configured to fit over the bridge of a wearer's nose.

The earbuds 12, 14 may include a left earbud 12 and a right earbud 14, each configured as a true wireless earbud 12, 14 lacking any external wires. Each earbud 12, 14 may comprise a housing 26 with a speaker therein, and an earpiece 28 configured for directing sound from the speaker into a user's ear canal. The earbuds 12, 14 may additionally include a battery within the housing 26 and electrical contacts 30 coupled to the battery. Optionally, each earbud 12, 14 may include a microphone.

The eyeglasses 10 may additionally include a left accessory arm 32 coupled to the left temple 20, and a right accessory arm 34 coupled to the right temple 22. Each of the accessory arms 32, 34 may comprise a flexible material allowing the accessory arms 32, 34 to be moved between a stowed position and a deployed position. FIG. 1 shows the right accessory arm 34 in the stowed position, and shows the left accessory arm 32 in the deployed position. For example, each of the accessory arms 32, 34 may be comprise a flexible polymer surrounding a metal wire, the metal wire configured to maintain the shape of the accessory arm 32, 34, yet allow the deformation of the accessory arm 32, 34 in response to an applied force.

The eyeglasses 10 may additionally include electronic components, such as one or more batteries. For example, each of the temples 20, 22 may house a battery that may be electrically coupled to electrical contacts 36 located on each of the accessory arms 32, 34. The eyeglasses 10 may also include a charging circuit for charging the one or more batteries. In some embodiments, the charging circuit may be connected to the electrical contacts 36, such that a power source may be coupled to the electrical contacts 36 to charge the battery. In further embodiments, the charging circuit may be coupled to a port, such as a universal serial bus (USB) port (e.g., a micro USB or USB C port), so that a power source may be coupled to the port to charge the one or more batteries. In yet further embodiments, the charging circuit may be coupled to a wireless charging device located in the eyeglasses, such as an induction coil or antenna, such that a wireless power source may be utilized to charge the one or more batteries in the eyeglasses 10.

The left accessory arm 32 may be configured to couple with the left earbud 12, and the right accessory arm 34 may likewise be configured to couple with the right earbud 14. In addition to electrical contacts 30, each earbud 12, 14 may include a coupling feature 38 configured to couple the earbud 12, 14 to a respective accessory arm 32, 34. Each earbud 12, 14 may be selectively physically coupled to a respective accessory arm 32, 34 with the coupling feature 38 and electrically coupled to the accessory arm 32, 34 via the electrical contacts 30 of the earbuds 12, 14 and the electrical contacts 36 of the respective accessory arm 32, 34. Accordingly, when the earbuds 12, 14 are coupled to the accessory arms 32, 34, electric current may be provided to the earbuds 12, 14 from the eyeglasses 10, which may power and/or charge the earbuds 12, 14. Additionally, the accessory arms 32, 34 may be positioned so that a user may wear the eyeglasses 10 with the earbuds 12, 14 inserted into the user's ears while the earbuds 12, 14 are provided electrical current from the eyeglasses 10.

In some embodiments, the coupling feature 38 may be a geometric feature sized and configured to provide a friction and/or interference fit between each earbud 12, 14 and a respective accessory arm 32, 34. For example, each earbud 12, 14 may include a channel formed therein that is sized to correspond to an outer surface of the corresponding accessory arm 32, 34. The channel may be sized so that an upper portion may be slightly narrower than a portion of the accessory arm 32, 34, such that the upper portion may slightly deform when inserted over the accessory arm 32, 34, and resiliently regain shape upon full insertion over the accessory arm 32, 34, thus providing an interference fit.

In some embodiments, the coupling feature 38 may comprise magnets in the earbuds 12, 14, the accessory arms 32, 34, or both, which may be located and configured to provide a magnetic coupling between the earbuds 12, 14 and the accessory arms 32, 34.

Figure 2A:
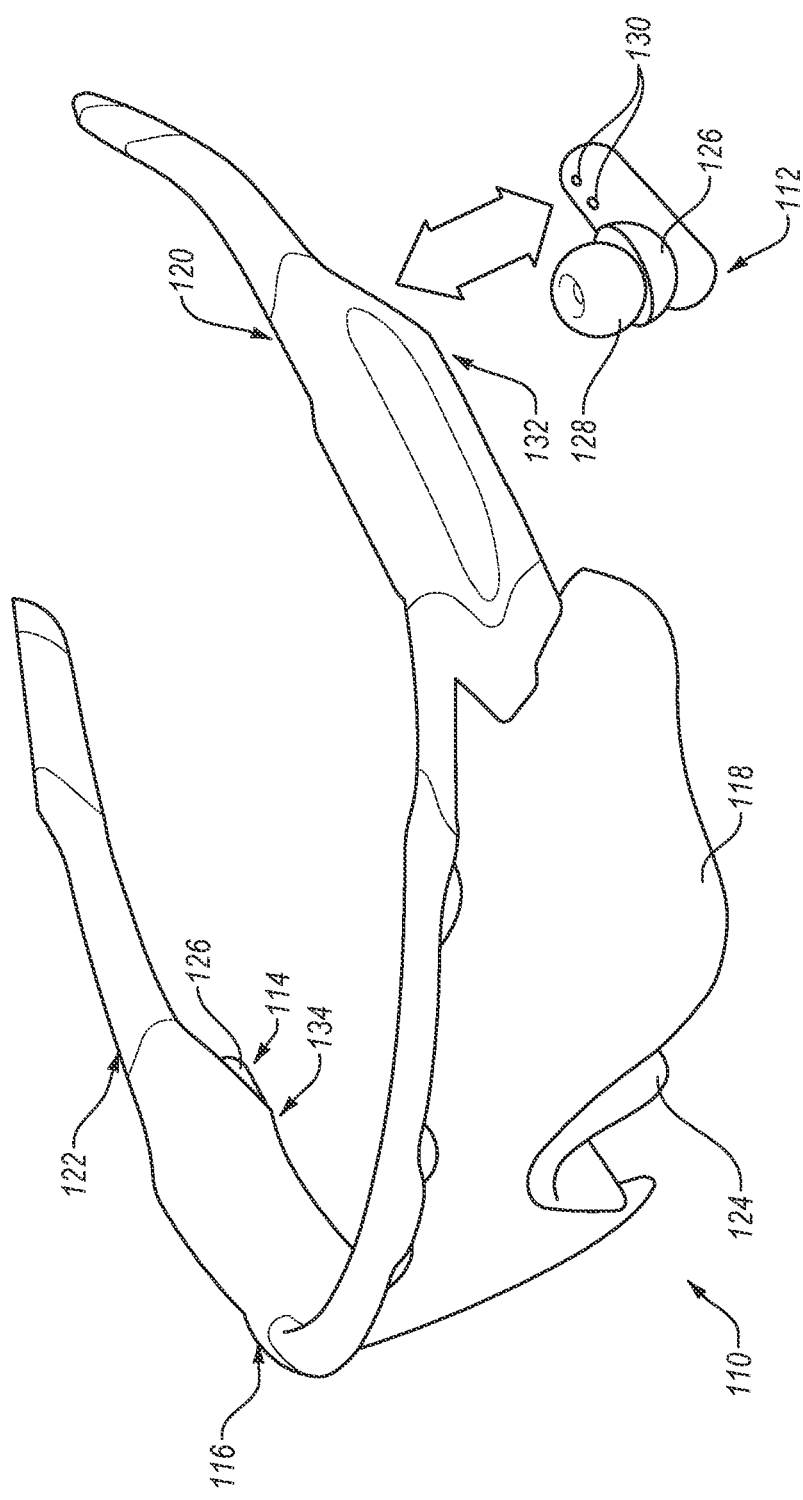
FIG. 2A is an isometric top view of eyeglasses with associated true wireless earbuds according to another embodiment of the present disclosure.
Figure 2B:
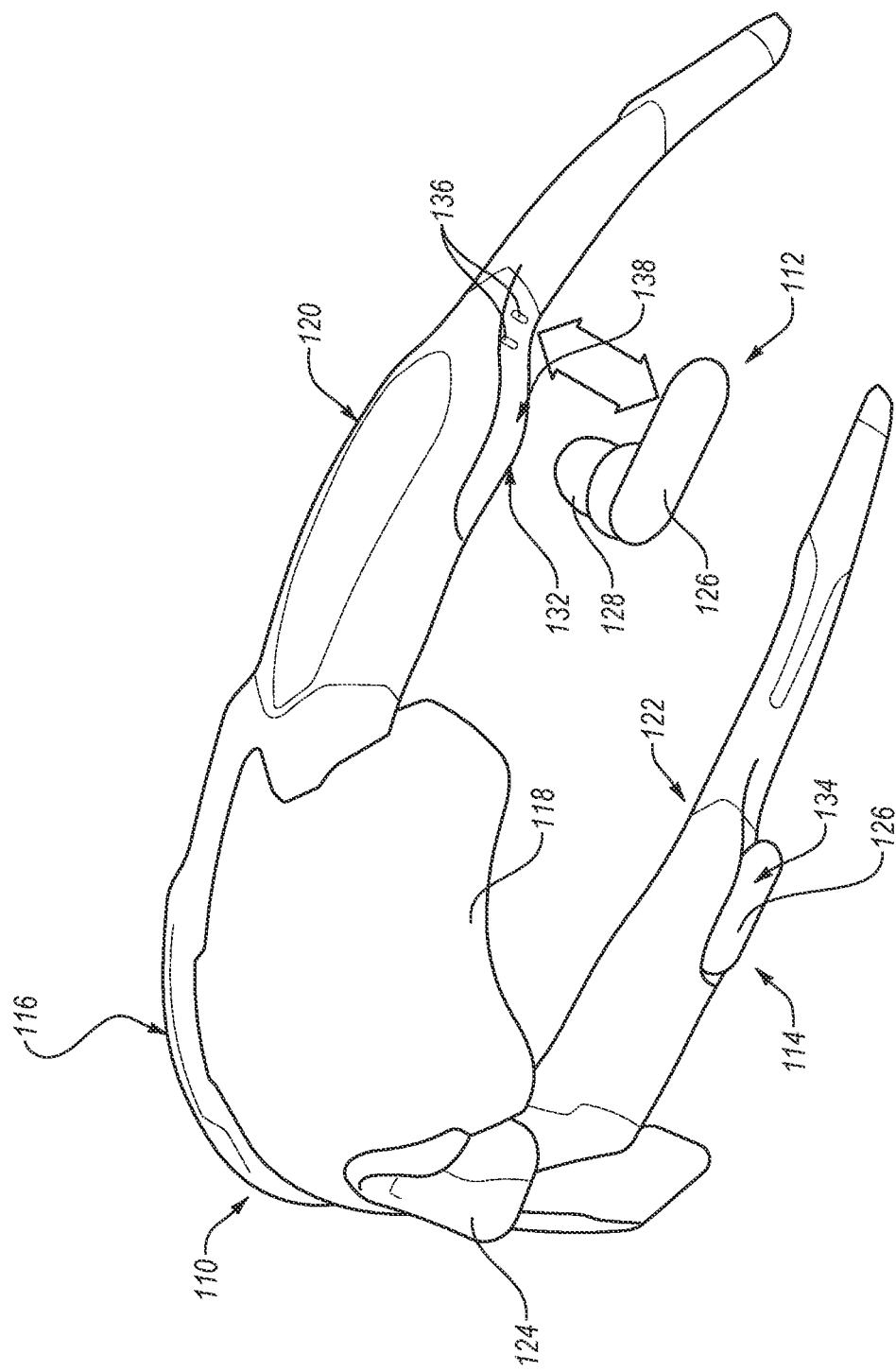
FIG. 2B is an isometric bottom view of the eyeglasses with associated true wireless earbuds of FIG. 2A.

FIG. 2A shows an isometric top view, and FIG. 2B shows an isometric bottom view, of eyeglasses 110 and associated earbuds 112, 114 according to another embodiment of the present disclosure. Similar to the eyeglasses 10, the eyeglasses 110 may comprise a frame 116 and at least one lens 118. The frame 116 may comprise a left temple 120, and a right temple 122, which may be configured to extend over a wearer's ears. The eyeglasses 110 may additionally include a nose pad 124, which may be configured to fit over the bridge of a wearer's nose.

Like the earbuds 12, 14, the earbuds 112, 114 may include a left earbud 112 and a right earbud 114, each configured as a true wireless earbud 112, 114 lacking any external wires. Each earbud 112, 114 may comprise a housing 126 with a speaker therein, and an earpiece 128 configured for directing sound from the speaker into a user's ear canal. The earbuds 112, 114 may additionally include a battery within the housing 126 and electrical contacts 130 coupled to the battery. Optionally, each earbud 112, 114 may include a microphone.

The eyeglasses 110 may additionally include a left storage compartment 132 in the left temple 120, and a right storage compartment 134 located in the right temple 122. Each of the storage compartments 132, 134 may be sized and configured to couple with a corresponding earbud 112, 114. FIGS. 2A and 2B show the right earbud 114 coupled to the right storage compartment 134, and show the left earbud 112 removed from the left storage compartment 132.

The eyeglasses 110 may additionally include electronic components, such as one or more batteries. For example, each of the temples 120, 122 may house a battery that may be electrically coupled to electrical contacts 136 located in each of the storage compartments 132, 134. The eyeglasses 110 may also include a charging circuit for charging the one or more batteries. In some embodiments, the charging circuit may be connected to the electrical contacts 136, such that a power source may be coupled to the electrical contacts 136 to charge the battery. In further embodiments, the charging circuit may be coupled to a port, such as a USB port (e.g., a micro USB or USB C port), so that a power source may be coupled to the port to charge the one or more batteries. In yet further embodiments, the charging circuit may be coupled to a wireless charging device located in the eyeglasses, such as an induction coil or antenna, such that a wireless power source may be utilized to charge the one or more batteries in the eyeglasses 110.

The left storage compartment 132 may be configured to store the left earbud 112, and the right storage compartment 134 may likewise be configured to store the right earbud 114. Each storage compartment 132, 134 may include a coupling feature 138 configured to couple the earbud 112, 114 to a respective storage compartment 132, 134. Each earbud 112, 114 may be selectively physically coupled to a respective storage compartment 132, 134 with the coupling feature 138 and electrically coupled to the eyeglasses 10 via the electrical contacts 130 of the earbuds 112, 114 and the electrical contacts 136 of the respective storage compartments 132, 134. Accordingly, when the earbuds 112, 114 are coupled to the storage compartments 132, 134, electric current may be provided to the earbuds 112, 114 from the eyeglasses 110, which may power and/or charge the earbuds 112, 114.

In some embodiments, the coupling feature 138 may be a geometric feature sized and configured to provide a friction and/or interference fit between each earbud 112, 114 and a respective storage compartment 132, 134.

In some embodiments, the coupling feature 138 may comprise magnets in the earbuds 112, 114, the storage compartment 132, 134, or both, which may be located and configured to provide a magnetic coupling between the earbuds 112, 114 and the storage compartments 132, 134.

Figure 3:
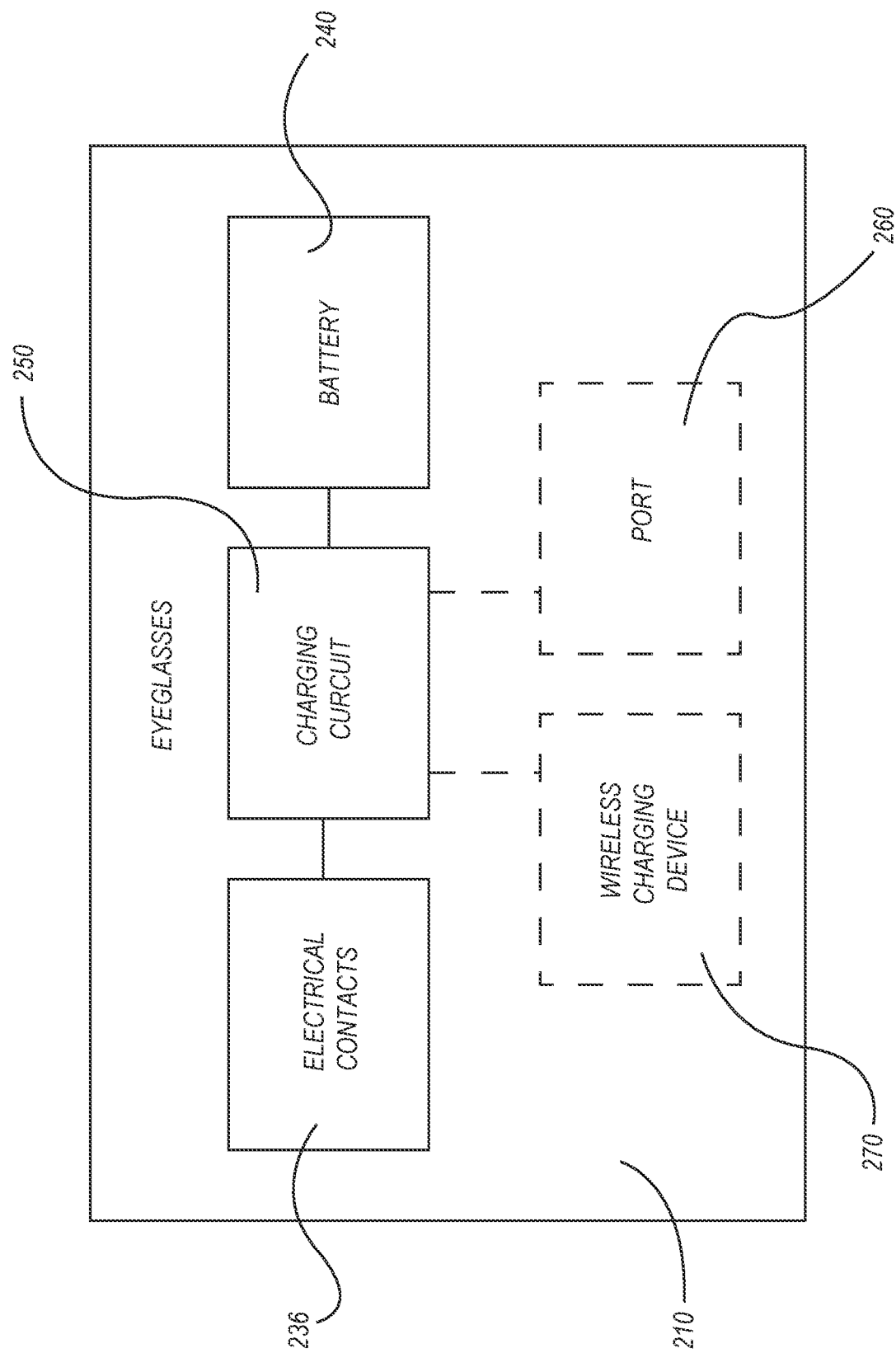
FIG. 3 is an electrical schematic diagram of eyeglasses according to embodiments of the present disclosure, such as the eyeglasses of FIGS. 1 and 2A.

An electrical schematic of eyeglasses 210 according to embodiments of the present disclosure is shown in FIG. 3. As shown, the eyeglasses 210 may include electrical contacts 236 and a battery 240 electrically coupled to a charging circuit 250. Optionally, the charging circuit 250 may be electrically coupled to a port 260 and/or a wireless charging device 270. The eyeglasses 210 may be configured generally as the eyeglasses 10 (FIG. 1) and/or the eyeglasses 110 (FIGS. 2A-2B) with electrical contacts 236 configured generally as the electrical contacts 36 (FIG. 1) and/or the electrical contacts 136 (FIGS. 2A-2B). Additionally, the battery 240, the charging circuit 250, the port 260, and the wireless charging device 270 may be configured generally as the batteries, the charging circuits, the ports, and the wireless charging devices described with reference to the eyeglasses 10 (FIG. 1) and/or the eyeglasses 110 (FIGS. 2A-2B).

While the present disclosure has been described herein with respect to certain illustrated embodiments, those of ordinary skill in the art will recognize and appreciate that the present invention is not so limited. Rather, many additions, deletions, and modifications to the illustrated and described embodiments may be made without departing from the scope of the invention as hereinafter claimed along with their legal equivalents. In addition, features from one embodiment may be combined with features of another embodiment while still being encompassed within the scope of the invention as contemplated by the inventor.

What is claimed is:

1. Eyeglasses comprising:
   a left temple;
   a right temple;
   a left accessory arm coupled to the left temple, the left accessory arm configured to couple with a left true wireless earbud; and
   a right accessory arm coupled to the right temple, the right accessory arm configured to couple with a right true wireless earbud;
   wherein the left accessory arm is configured to magnetically couple with the left true wireless earbud, and the right accessory arm is configured to magnetically couple with the right true wireless earbud; and
   wherein the left accessory arm and the right accessory arm are moveable between a stowed position and a deployed position.

2. The eyeglasses of claim 1, wherein each of the right accessory arm and the left accessory arm are configured to deform in response to an applied force, and maintain a deformed shape when the force is released.

3. The eyeglasses of claim 2, wherein each of the right accessory arm and the left accessory arm comprise a flexible polymer surrounding a metal wire.

4. The eyeglasses of claim 3, wherein the left accessory arm is sized and configured to couple with the left true wireless earbud via an interference fit; and the right accessory arm is sized and configured to couple with the right true wireless earbud via an interference fit.

5. The eyeglasses of claim 1, further comprising a battery.

6. The eyeglasses of claim 5, further comprising:
   electrical contacts positioned on the left accessory arm to connect with electrical contacts of the left true wireless earbud when the left true wireless earbud is coupled to the left accessory arm; and
   electrical contacts positioned on the right accessory arm to connect with electrical contacts of the right true wireless earbud when the right true wireless earbud is coupled to the right accessory arm.

7. The eyeglasses of claim 5, further comprising a port configured to couple with a power source.

8. The eyeglasses of claim 5, further comprising a wireless charging circuit configured to charge the battery via power received by at least one of an induction coil and an antenna.

9. Eyeglasses comprising:
   a left temple;
   a right temple;
   a left accessory arm coupled to the left temple, the left accessory arm configured to couple with a left true wireless earbud;
   a right accessory arm coupled to the right temple, the right accessory arm configured to couple with a right true wireless earbud;
   a left storage compartment located in the left temple sized and configured to couple with a left true wireless earbud; and
   a right storage compartment located in the right temple sized and configured to couple with a right true wireless earbud;
   wherein the left accessory arm is configured to magnetically couple with the left true wireless earbud, and the right accessory arm is configured to magnetically couple with the right true wireless earbud; and
   wherein the left storage compartment is configured to magnetically couple with the left true wireless earbud, and the right storage compartment is configured to magnetically couple with the right true wireless earbud.

10. The eyeglasses of claim 9, wherein the left storage compartment comprises a geometric feature sized and configured to couple with the left true wireless earbud via at least one of friction and an interference fit; and the right storage compartment comprises a geometric feature sized and configured to couple with the right true wireless earbud via at least one of friction and an interference fit.

11. The eyeglasses of claim 9, further comprising a battery.

12. The eyeglasses of claim 11, further comprising:
   electrical contacts positioned in the left storage compartment to connect with electrical contacts of the left true wireless earbud when the left true wireless earbud is coupled to the left storage compartment; and
   electrical contacts positioned in the right storage compartment to connect with electrical contacts of the right true wireless earbud when the right true wireless earbud is coupled to the right storage compartment.

13. The eyeglasses of claim 11, further comprising a port configured to couple with a power source.

14. The eyeglasses of claim 11, further comprising a wireless charging circuit configured to charge the battery via power received by at least one of an induction coil and an antenna.

15. The eyeglasses of claim 9, wherein the eyeglasses are configured to charge the left true wireless earbud and the right true wireless earbud when the left true wireless earbud is coupled to the left temple and the right true wireless earbud is coupled to the right temple.

16. The eyeglasses of claim 9, wherein the eyeglasses are configured to allow a user to wear the eyeglasses while the left true wireless earbud and the right true wireless earbud are charged by the eyeglasses.

17. The eyeglasses of claim 9, wherein the eyeglasses are configured to allow a user to wear the eyeglasses while the left true wireless earbud is inserted into a user's left ear canal and the right true wireless earbud is inserted into a user's right ear canal.

* * * * *